United States Patent [19]
Sobanski

[11] 3,956,595
[45] May 11, 1976

[54] CIRCUITRY FOR PROVIDING EXECUTIVE RINGBACK IN A PBX SYSTEM

[75] Inventor: Edward Walter Sobanski, Boulder, Colo.

[73] Assignee: Western Electric Company, New York, N.Y.

[22] Filed: Oct. 3, 1974

[21] Appl. No.: 511,753

[52] U.S. Cl............................................ 179/18 BG
[51] Int. Cl.²........................................ H04M 3/48
[58] Field of Search............ 179/18 B, 18 BG, 84 B

[56] References Cited
UNITED STATES PATENTS

| | | | |
|---|---|---|---|
| 2,753,401 | 7/1956 | Pharis............................ | 179/27 FE |
| 3,517,139 | 6/1970 | Whitney........................ | 179/18 BG |
| 3,676,606 | 7/1972 | Gueldenpfennig et al..... | 179/18 BG |
| 3,854,014 | 12/1974 | Akin et al...................... | 179/18 BG |

*Primary Examiner*—William C. Cooper
*Attorney, Agent, or Firm*—C. S. Phelan

[57] ABSTRACT

In a telephone switching system wherein a plurality of line circuits are terminated in station sets, the line circuits are interconnectable to a plurality of trunk circuits through a multistage switching network. A call originated by a calling party to a called party, engaged in a conversation with a third party, is completed at the conclusion of the conversation between the called party and the third party by ringing back the calling party provided the calling party is equipped with the class of service which permits executive ringback. The ringback feature is initiated by the calling party upon receipt of a busy tone by a flashing of his switchhook.

16 Claims, 4 Drawing Figures

CIRCUITRY FOR PROVIDING EXECUTIVE RINGBACK IN A PBX SYSTEM

BACKGROUND OF THE INVENTION

1. Field of the Invention

This invention relates to Private Branch Exchange (PBX) switching systems and, in particular, to circuitry for providing an executive ringback feature.

2. Description of the Prior Art

In prior art PBX systems the ability of a calling party to be rung back after placing a call to a busy called party required the calling party, upon receipt of a busy tone, either to hang up and then dial a special ringback code followed by the directory number of the busy called party or to flash his switchhook and then dial in a time code when callback was to be attempted. One of the disadvantages in implementing executive ringback in accordance with the first approach is that the calling party must first hang up upon receipt of the busy tone. Another disadvantage is that special circuitry must be provided in the PBX system to recognize the special code required to initiate an executive ringback sequence. A third disadvantage is that the calling party must redial the directory number of the busy called party once the PBX system has been alerted that an executive ringback request has been made. A disadvantage with the second approach is that the called party may have completed his conversation with the third party a substantial time period prior to ringback and, as a result, he may no longer be in the area of his station set. Hence, although ringback is implemented it is of little utility. These disadvantages make the provision of executive ringback expensive in both the amount of time required to effect a ringback and in the amount of equipment needed to supply this feature, and, also, limit the utility of such a service.

Accordingly, it is one object of the present invention to reduce the amount of time expended by a calling party in effecting an executive ringback function.

Another object is to eliminate the need for the calling party to redial the directory number of the busy called party.

A further object of the present invention is to reduce the amount of PBX system equipment required to provide an executive ringback feature.

Yet another object is to eliminate the need for the calling party to first hang up and then dial a special executive ringback code.

Still another object of the present invention is to effect the ringback immediately upon the called station going idle after completion of the conversation with the third party.

SUMMARY OF THE INVENTION

These and other objects of the invention are realized in accordance with an illustrative embodiment of a telephone switching system having a plurality of line circuits terminated in station sets wherein the line circuits are interconnectable to a plurality of trunk circuits through a multistage switching network. Any calling station is able to effect an executive ringback function at the conclusion of a connection between a busy called station and a third party station provided the calling station is supplied with a class of service which permits executive ringback. Detection of the class of service indication providing for executive ringback causes an executive ringback trunk to be seized upon a marker receiving an indication that the called station is busy. Actuation of the executive ringback sequence is initiated by a switchhook flash at the calling station.

Accordingly, it is one feature of the present invention that a connection is established through the network from a calling station to an executive ringback trunk and through the network from the executive ringback trunk to a called station in response to the detection of a busy condition of the called station and a predetermined class of service of the calling station.

Another feature is that a switchhook flash following a busy tone is recognized by the executive ringback trunk as an executive ringback signal and thereby enables the trunk for establishing a connection between the calling station and the called station at the conclusion of the connection between the called station and a third party station.

A further feature of the present invention is that a ringing signal is supplied to the called station if the called station goes idle before switchhook flash by the calling station.

Yet another feature is that the calling and called stations are connected immediately upon the termination of previous connections between the called station and the third party station.

Still another feature is that talk battery supervision is provided to both the calling and called stations by the executive ringback trunk.

DESCRIPTION OF THE DRAWINGS

These and other objects and features of the invention will become more apparent upon consideration of the following detailed description and appended claims in connection with the attached drawings of an illustrative embodiment in which:

FIG. 4 is placed adjacent to the bottom of FIG. 3, is an illustrative embodiment of an executive ringback trunk circuit.

DETAILED DESCRIPTION

Figure 2:
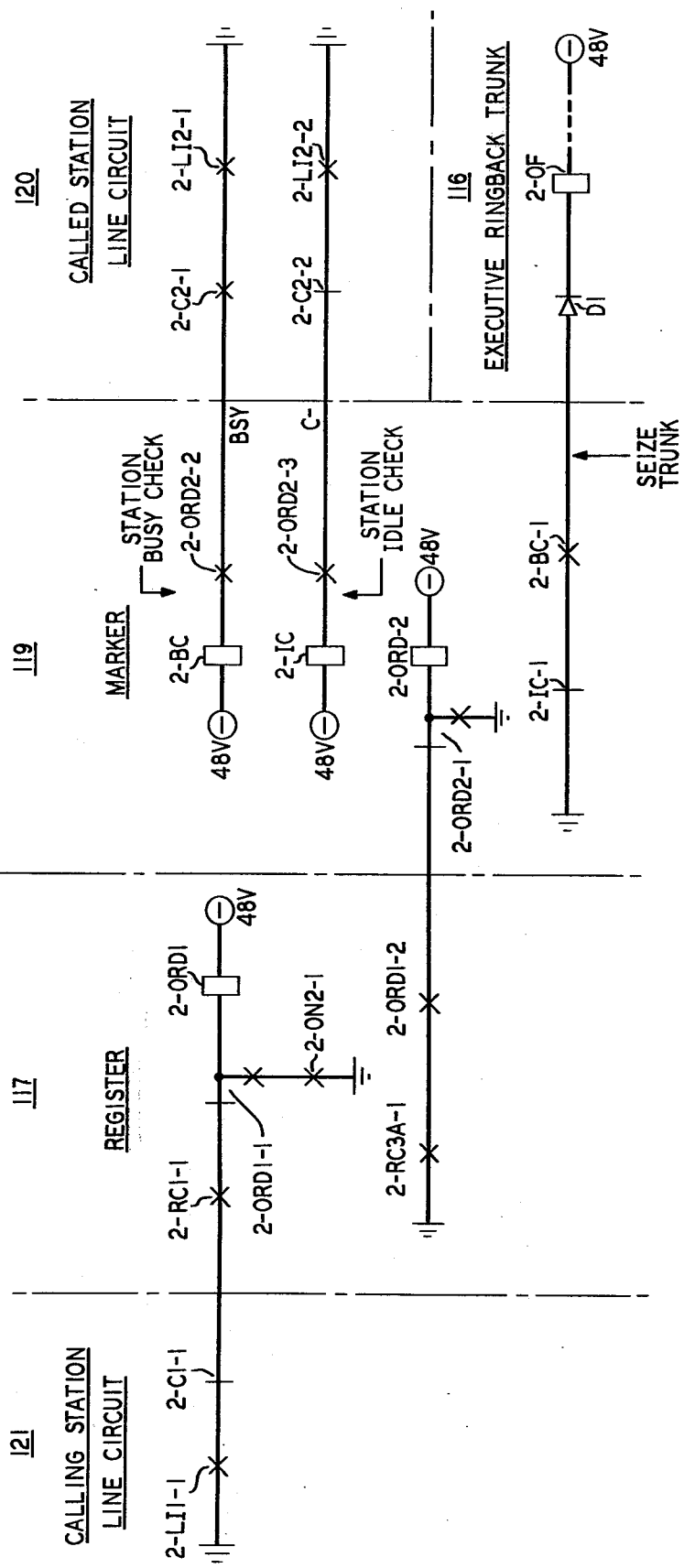
FIG. 2 is a detached contact schematic illustrating the manner in which an executive ringback trunk is seized.
Figure 3:
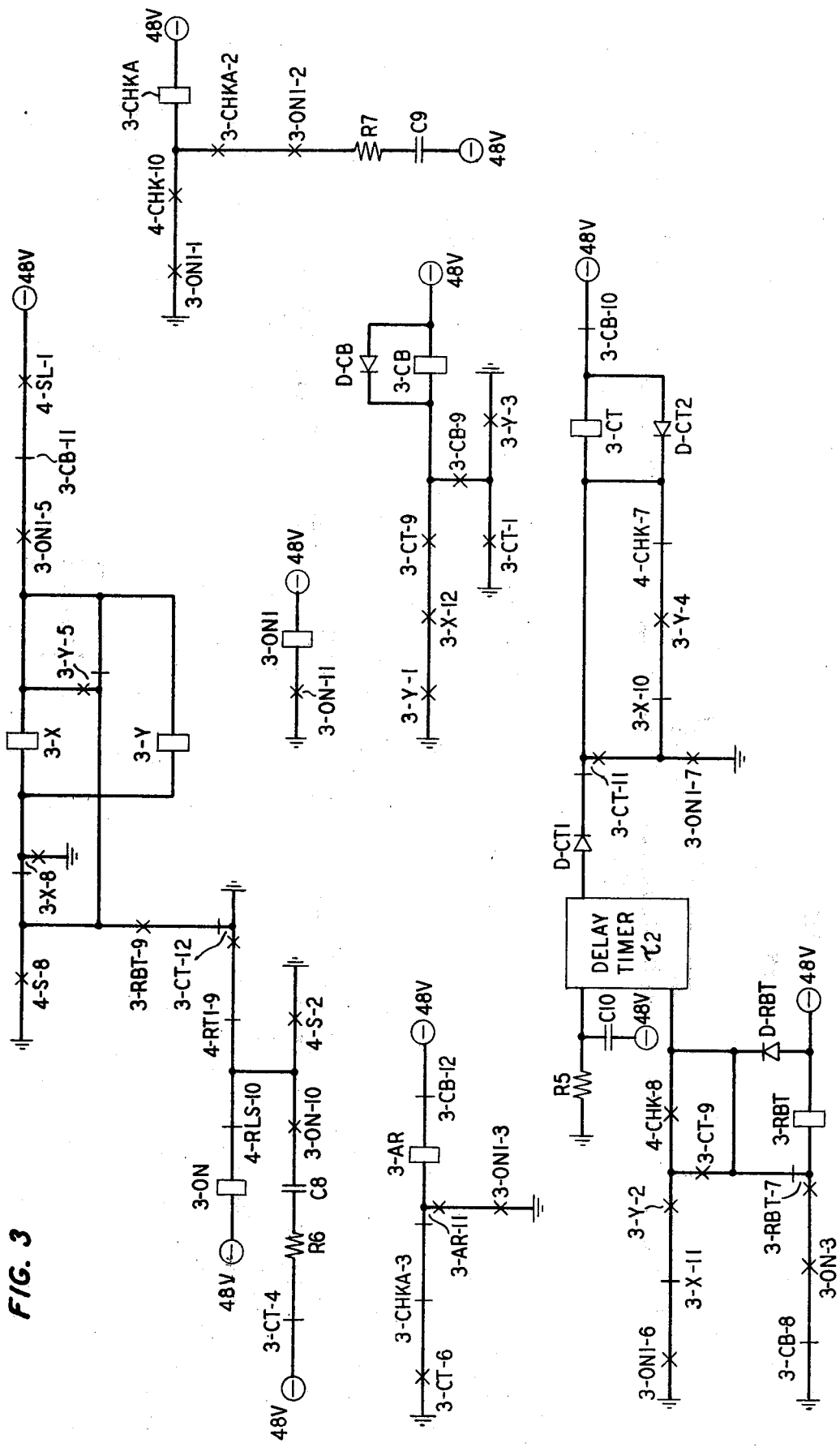
FIGS. 3 and 4, when
Figure 4:
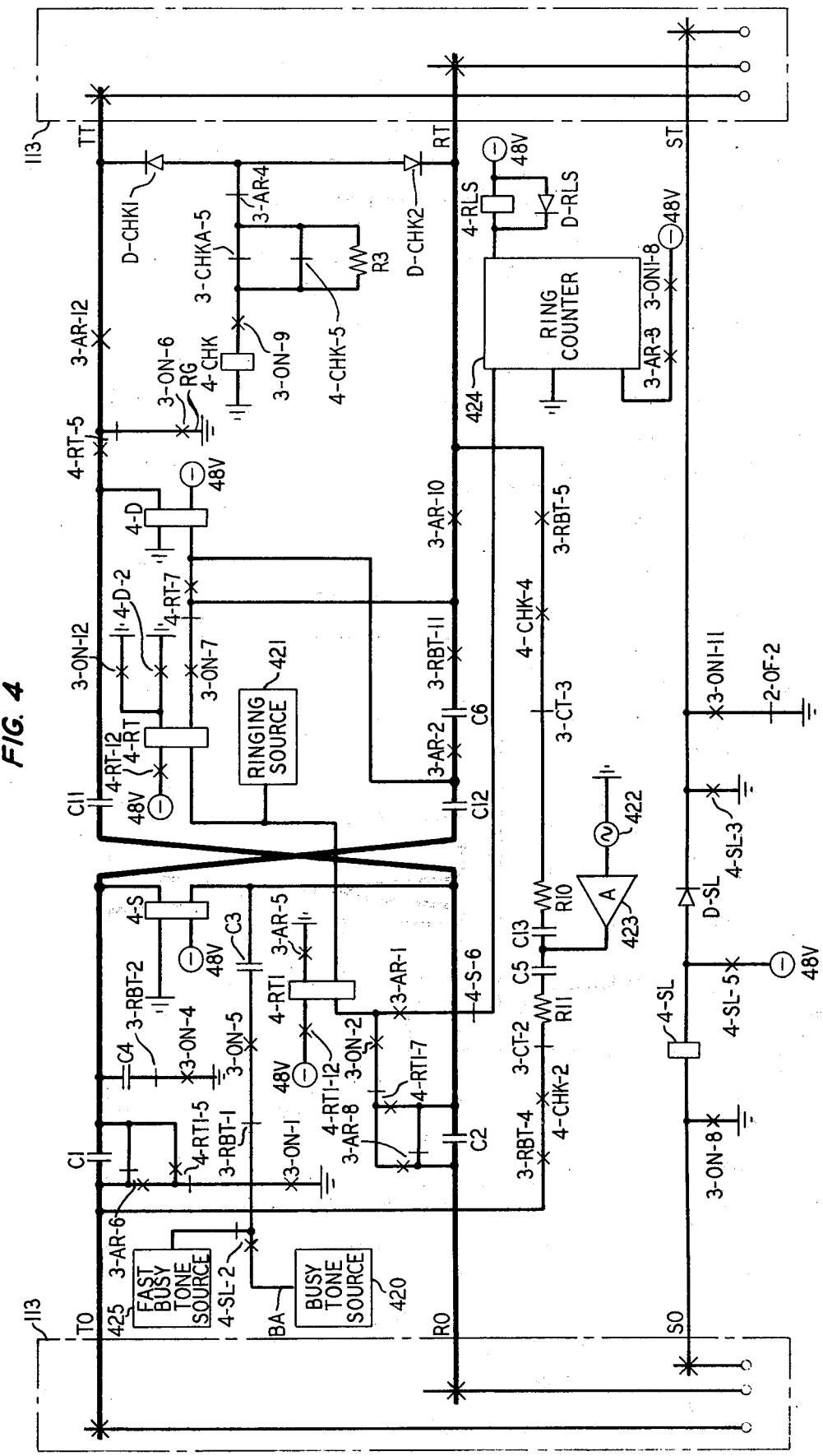

It should be noted that FIGS. 2 through 4 employ a type of notation referred to as "detached contact" in which an "X", shown intersecting a conductor, respresents a normally open contact of a relay and a bar, shown intersecting a conductor at right angles, represents a normally closed contact of a relay; "normally" referring to the unoperated condition of the relay. The principles of this type of notation are described in an article entitled "An Improved Detached Contact Type Schematic Circuit Drawing" by F. T. Meyer in the September 1955 publication of the *American Institute of the Electrical Engineers Transactions, Communications and Electronics*, Vol. 74, pages 505–513.

It should be noted that in order to simplify the disclosure and thus facilitate a more complete understanding of the embodiment, relays, relay contacts and other electromechanical devices, shown in FIGS. 2 through 4, have been given systematic designations. Thus, the number preceding the letter designation of each device corresponds to the figure in which the control circuit of the device is shown. For example, the control circuit for relay RT is shown in FIG. 4, and therefore, is referred to as 4-RT. Each relay contact, whether make, break or transfer, is shown with its specific contact number preceded by the designation of the relay to which it belongs. As an example, the notation 4-RT-12 indicates contact number 12 of the RT relay, the control circuit of which is shown in FIG. 4.

1.1 General Description

Figure 1:
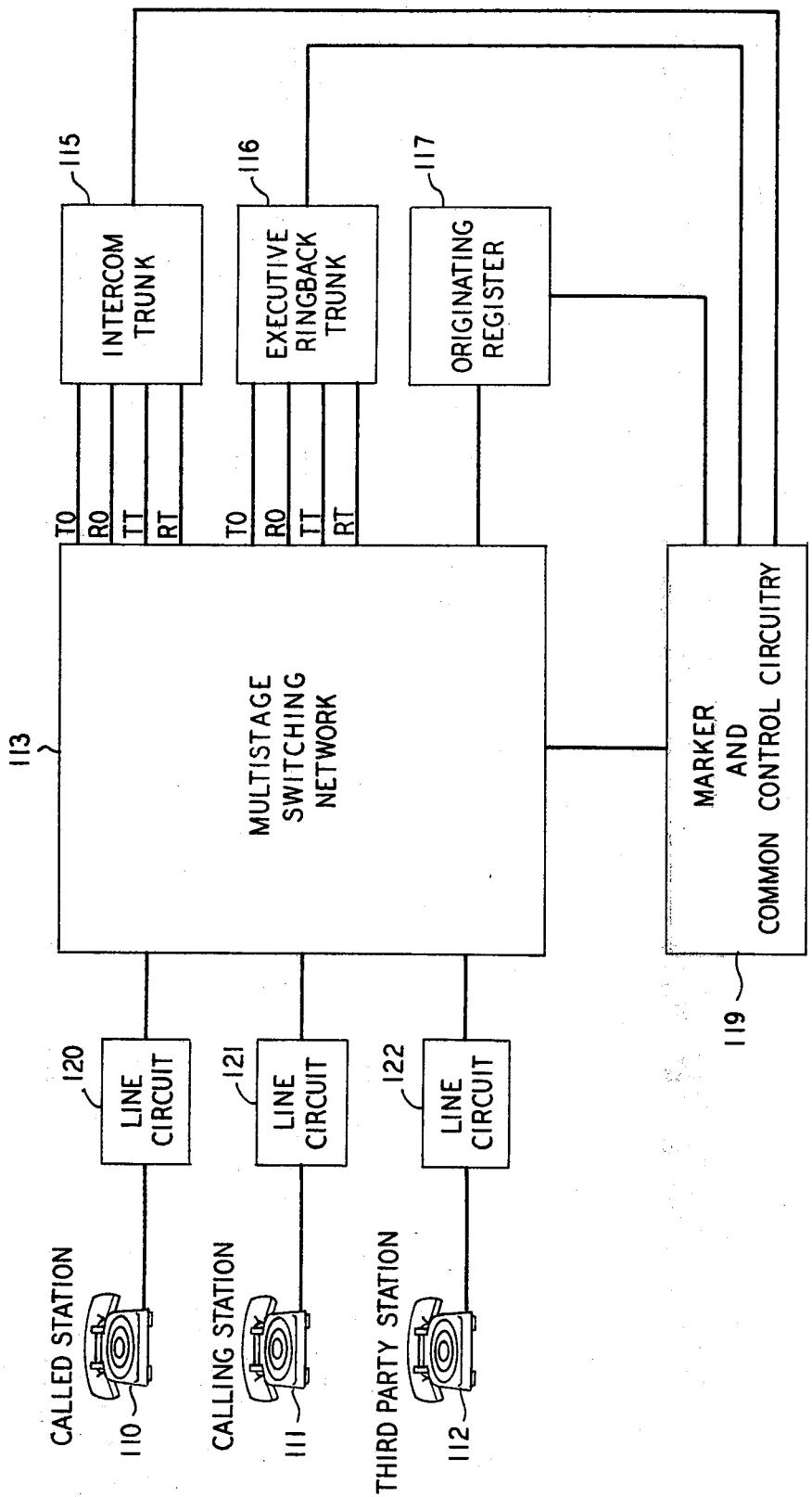
FIG. 1 is a generalized schematic representation of a network connection for providing an executive ringback function.

Before an executive ringback feature takes on any significance there must be a connection between a called station 110, as shown in FIG. 1, and a third party station 112. This interconnection is effected through an intercom trunk 115 and a multistage switching network 113 operating under the control of a marker 119 in a manner, for example, similar to that set out at column 18 et seq. of H. H. Abbott et al. U.S. Pat. No. 2,949,506, issued Aug. 16, 1960. It should be noted that the called station 110, a calling station 111 and the third party station 112 are connected to the multistage switching network 113 through line circuits 120, 121, and 122, respectively.

When the calling station 111 is provided with a class of service which allows executive ringback and when an attempt is made to place a similar call to the called station 110, the calling station 111, upon detection of the busy condition of the called station 110 by the marker 119, is connected to an executive ringback trunk circuit 116. Ascertainment of whether the calling station 111 has the requisite class of service which entitles it to executive ringback is effected by class of service check circuitry which is partially located in an originating register 117 and partially located in the marker 119. An example of the manner in which this class of service check may be made is set out in A. Zarouni U.S. Pat. No. 3,141,931, issued July 21, 1964.

Following connection of the calling station 111 to the executive ringback trunk circuit 116, a request for implementation of the executive ringback feature is made by a flashing of the switchhook of the calling station 111. Upon receipt of the switchhook flash, signaling circuitry in the executive ringback truck circuit 116 is connected to the called station 110. The switchhook flash by the calling station 111 causes the busy tone to be removed and a special ringback signal to be supplied to both the calling station 111 and the called station 110. At this point the calling station 111 may go on-hook and the crosspoint connection through the multistage switching network 113 to the executive ringback trunk 116 is maintained. When the called station 110 returns to an idle condition, a ringing signal is supplied to both the called station 110 and the calling station 111. If both stations respond to the ringing signal by going off-hook a talking path between the called station 110 and the calling station 111 is completed through the executive ringback trunk 116.

If the called station 110 goes idle sometime after the executive ringback trunk 116 has been seized, but prior to flashing of the switchhook by the calling station 111, the switchhook flash by the calling station 111 causes busy tone to be removed and the called station 110 is immediately rung via the executive ringback trunk circuit 116.

1.2 Class of Service Check

Executive ringback capability is provided only to those calling stations 111 which have been supplied with a class of service which entitles that station to an executive ringback feature. A check of the executive ringback class of service is effected by circuitry of the type shown in FIG. 2. When a calling station 111 goes off-hook, a switchhook contact (not shown) is closed. This contact closure actuates a line relay, similar to line relay L30 shown in FIG. 35 of the aforementioned Abbott et al. patent, in line circuit 121 and provides a service request indication to marker 119, as shown in FIG. 1, for an idle register of the type illustrated by originating register 117. All of the foregoing actions occur whenever a calling station 111 in a PBX system goes off-hook, as set out in the previously mentioned Abbott et al. patent, and are included in this description only for purposes of illustrating how an idle register 117 is seized for calling station 111.

With the marker 119 having found an idle register 117, the class of service of the calling station 111 is forwarded to the register 117, and, in turn, is passed to the marker 119. An illustration of how the class of service information is routed to the marker 119 is shown in FIG. 2 in simplified form. Routing of the class of service is effected by supplying a ground potential to one sie of a 2-ORD1 class of service detection relay, the other side of which is held at a battery potential of −48 volts. The ground potential to operate the 2-ORD1 relay is supplied through a normally open contact 2-LI1-1 of a line identification relay, a normally closed contact 2-C1-1 of a line cutoff relay, a normally open contact 2-RC1-1 of a register connect relay, and a normally closed contact 2-ORD1-1 of the class of service detection relay 2-ORD1. It should be noted that the line identification relay, the line cutoff relay and the register connect relay are utilized in any type of PBX connection and are included in this description for illustrative purposes only since they form no essential part of the present invention.

Operation of the 2-ORD1 relay is locked by a ground path through a normally open contact 2-ORD1-1 and a normally open contact 2-ON2-1 of an off normal relay. Actuation of the 2-ORD1 relay causes the class of service indication to be passed to the originating register 117. At this point a dial tone is received and the calling station 111 dials the directory number of the called station 110.

1.3 Busy/Idle Check of Called Station

When the directory number of the called station 110 has been dialed, a dial complete bid is forwarded from the register 117 to the marker 119. The dial complete bid recalls marker 119 in order to perform a busy/idle check of the called station 110. Busy verification checks are well documented in the prior art of which the E. L. Erwin et al. U.S. Pat. No. 3,410,960 issued Nov. 12, 1968 is an example. Accordingly, only a simplified version is included in the present disclosure for illustration purposes.

Recall of the marker 119 is effected by providing a ground potential through a normally open contact 2-RC3A-1 of a register complete relay, a normally open contact 2-ORD1-2 of the 2-ORD1 relay, and a normally closed contact 2-ORD2-1 of a 2-ORD2 relay. With the marker 119 recalled the executive ringback class of service indication is forwarded to it by actuation of the 2-ORD2 relay. For similar reasons to those noted above with regard to the line identification relay, the control circuit for the register complete relay need not be shown since it merely controls the gating of any and all information from the register 117 to the marker 119 and, hence, forms no essential part of the present invention.

It should be recalled that actuation of the 2-ORD1 relay caused the normally open contact 2-ORD1-2 to close with the result that a ground potential is applied to one side of the 2-ORD2 relay. With the opposite side of the 2-ORD 2 relay held at a battery potential of −48 volts, the relay operates and is held operated by application of a ground potential through a normally open contact 2-ORD-1 of the 2-ORD2 relay.

Having recalled the marker 119 the busy/idle check of the called station 110 connected to line circuit 120 is implemented by checkinig the status of a busy check relay 2-BC and an idle check relay 2-IC. The busy check relay 2-BC is actuated if the called station 110 is busy since a ground potential will be provided to one side of the 2-BC relay, the other side of which is held at a battery potential of −48 volts. The ground to operate the 2-BC relay is supplied through normally open contacts 2-LI2-1, 2-C2-1 of called station line circuit 120 and 2-ORD2-2, respectively.

If the called station 110 is busy, both its line identification relay and line cutoff relay will have been actuated with the result that the normally open contacts 2-LI2-1 and 2-C2-1 will be closed. Closure of these contacts coupled with closure of the 2-ORD2-2 contact of the 2-ORD2 relay actuates the 2-BC relay. If the called station 110 is idle, its line cutoff relay will not be actuated. Consequently, normally closed contact 2-C2-2 remains closed and a ground potential to operate the idle check relay 2-IC is supplied from the called station 110 through a normally open contact 2-LI2-2 of its line identification relay, the normally closed contact 2-C2-2 of its line cutoff relay, and a normally open contact 2-ORD2-3 of the 2-ORD2 relay.

1.4 Executive Ringback Trunk Circuit Seizure

Following the busy/idle check the marker 110 will either seize the executive ringback trunk 116 if the called station 110 is busy, or, if the called station 110 is idle, the intercom trunk 115 will be seized to complete the connection. This latter connection is of no further interest in this context and will not be pursued farther.

For the situation wherein the called station 110 is busy, the 2-BC relay is actuated causing a normally open contact 2-BC-1 to close. In addition, if the called station 110 is busy, the idle check relay 2-IC is not actuated and its normally closed contact 2-IC-1 remains closed. With the states of these two relays being as noted, a ground potential is applied to the executive ringback trunk 116 through a line protection DC blocking diode D1 to a 2-OF relay thereby actuating it and seizing the trunk. Actuation of the 2-OF relay breaks the potential ground path to a sleeve lead ST, as shown in FIG. 4, by opening a normally closed contact 2-OF-2.

1.5 Path Completion to Calling Station

Subsequent action by marker 119 results in an idle path through the multistage switching network 113 being selected and a signaling path being completed to the calling station 111. Completion of this path subjects the calling station 111 to the control of a supervisory relay 4-S, as shown in FIG. 4. Actuation of the supervisory relay 4-S is effected by completion of a loop through the calling station 111 via a normally closed contact 3-AR-8 of a 3-AR relay in a ring lead RO and a normally closed contact 3-AR-6 in a tip lead TO. The operation of relay 4-S via the tip and ring crosspoint connection to the calling station loop provides talking battery to the calling station 111.

In addition to the foregoing, operation of relay 4-S causes an off normal relay 3-ON, shown in FIG. 3, to be actuated by application of ground through a normally open contact 4-S-2 and a normally closed contact 4-RLS-10 of a 4-RLS relay. Operation of the relay 3-ON closes a normally open contact 3-ON-10 closing a resistive-capacitive slow release loop around relay 3-ON. The resistive-capacitive loop is comprised of a resistor R6 and a capacitor C8 which, in the preferred embodiment, had values of 1500 ohms and 200 microfarads, respectively. A normally closed contact 3-CT-4 is included in the slow release loop for disabling it during other operations of relay 3-ON.

Operation of the 3-ON relay also partially enables a busy tone path BA, as shown in FIG. 4, to provide a busy tone from a busy tone source 420 to the calling station 111 via the tip and ring leads TO and RO, respectively, by closing a normally open contact 3-ON-5. A capacitor C3 is included in this path for DC isolation purposes.

In addition to the foregoing, actuation of the relay 3-ON causes an operate path for a relay 4-CHK to be prepared by closing a normally open contact 3-ON-9. Also, the closure of a normally open contact 3-ON-11, as shown in FIG. 3, provides a ground potential to one side of a 3-ON1 relay, the other side of which is held at a battery potential of −48 volts, thereby actuating it. With the relay 3-ON1 operated, an operate path for a relay 3-CHKA is prepared by closing a normally open contact 3-ON1-1. Operation of the relay 3-ON1 also provides holding grounds for relays 3-CT and 3-AR by closing normally open contacts 3-ON1-7 and 3-ON1-3, respectively. Closure of a normally open contact 3-ON1-6 prepares a ground start path for a delay timer τ2 associated with the relay 3-CT. Also, a battery start path for a ring counter 424, as shown in FIG. 4, is prepared by the closure of a normally open contact 3-ON1-8.

1.6 Path Completion Through Executive Ringback Trunk to Called Station

Following actuation of the 3-ON and 3-ON1 relays, a tip and ring crosspoint connection to the called station 110 is completed by the marker 119 selecting an idle path through the multistage switching network 113. Completion of the tip and ring crosspoint connection to the called station 110 provides a battery potential to operate the check line relay 4-CHK. The battery potential to actuate the 4-CHK relay is supplied over a tip lead TT through a line isolation diode D-CHK1 or over a ring lead RT through a similar line isolation diode D-CHK2 to a series connected pair of normally closed contacts 3-AR-4 and 4-CHK-5 and the normally open contact 4-ON-9. A resistor R3 is connected across normally closed contact 4-CHK-5. Resistor R3 keeps the current flow at a level just sufficient to maintain actuation of the relay 4-CHK following its initial operation. Minimization of the curent flow is necessary if the drain on the called station loop is to be kept at a low level. A resistance value for resistor R3 of 19.1 kilohms has been found suitable for this purpose.

With relay 4-CHK actuated, the ground path for actuation of the 3-CHKA relay is completed by the closure of a normally open contact 4-CHK-10. The release time of the relay 3-CHKA is controlled by a resistive-capacitive loop containing a resistor R7 and a capacitor C9 in a series path containing a pair of normally open contacts 3-ON1-2 and 3-CHKA-2. A resistance value for the resistor R7 of 1500 ohms and a capacitance value for the capacitor C9 of 200 microfarads are used in the preferred embodiment.

If the called station 110 is busy but is not ringing or is not camped-on, a relay 4-SL in a sleeve lead ST is operated by supplying battery from the called station 110 through a line protection DC blocking diode D-SL. With the 4-SL relay operated it is held operated by the application of battery potential through a normally open contact 4-SL-5 with ground being provided through a normally open contact 3-ON-8. The grounding of lead ST by the closure of a normally open contact 4-SL-3 serves as a camp-on denial signal for subsequent connections to the called station 110.

In addition to the controlling of the sleeve lead ST, actuation of the relay 4-SL closes a normally open contact 4-SL-1, as shown in FIG. 3, allowing battery potential of −48 volts to be applied to a flash detect relay 3-X. The battery path for the 3-X relay also includes a normally closed contact 3-CB-11 and a normally open contact 3-ON1-5 which had been closed previously. Ground path for actuation of the relay 3-X includes a normally open contact 4-S-8 and a normally closed contact 3-X-8. Once the relay 3-X is actuated, a ground lock path is provided through a normally open contact 3-X-8. Actuation of the 4-SL relay also closes the busy tone path BA to the calling station 111 by closing normally open contact 4-SL-2. The supplying of busy tone back to the calling station 111 occurs whenever the called station 110 is busy from other than a camp-on or a ringing condition. In these two cases a fast busy tone is returned to the calling station 111 indicating that the request for ringback is denied.

If the relay 4-SL does not operate, due to a ground condition on sleeve lead ST, indicating a camp-on or ringing condition, the relay 3-X will not operate. With relay 4-SL unoperated, the fast busy tone from a fast busy tone source 425 is provided to the calling station 111 through a path containing the normally open contact 3-ON-5. The relay 4-SL is held normal after the release of marker 119 by the application of ground on lead ST through a normally open contact 3-ON1-11 and the normally closed contact 2-OF-2. When the marker 119 releases, the relay 3-OF also releases thereby removing the bridged sleeve connection which initially grounded the sleeve lead ST. Consequently, with the relay 4-SL held normal the calling station 111 is unable to initiate a switchhook flash sequence which enables the ringback feature.

1.7 Calling Station Enables Ringback

Actuation of the executive ringback trunk 116 is effected in response to a switchhook flash at the calling station 111. With the executive ringback trunk 116 enabled a 440 Hertz tone is supplied to both the calling station 111 and the called station 110 for approximately 750 milliseconds. After the 440 Hertz tone is removed the calling party may go on-hook and remain on-hook until the connection between the called station 110 and the third party station 112 is concluded.

The switchhook flash at the calling station 111 causes the supervisory relay 4-S to release which, in turn, removes a shunt ground applied to a flash detect relay 3-Y through normally open contact 4-S-8 and a normally closed contact 3-Y-5, as shown in FIG. 3. Removal of the shunt ground from relay 3-Y allows it to operate with battery potential being supplied through normally open contacts 4-SL-1 and 3-ON1-5 and normally closed contact 3-CB-11. If the calling station 111 returns to an off-hook condition within approximately 1.2 seconds of depression of the switchhook for a flash, the supervisory relay 4-S reoperates via the held crosspoint connection to the calling station loop. The 1.2 second time interval is controlled by the resistor R6 and the capacitor C8 across the control winding of relay 3-ON. Insertion of resistor R6 and capacitor C8 into the control winding of relay 3-ON is implemented by the closure of the normally open contact 4-S-2. The reoperation of relay 4-S causes relay 3-X to be released while relay 3-Y remains in an operated condition.

With relay 3-Y operated a ground path to operate a relay 3-RBT is completed through normally open contacts 3-ON1-6, 3-Y-2, 4-CHK-8 and normally closed contacts 3-X-11 and 3-RBT-7. A diode D-RBT is connected between the source of battery potential and a ground input of delay timer τ2 to prevent application of the battery potential to this input. The operation of relay 3-Y also provides the ground to the input of delay timer τ2 and it maintains a release shunt path for relay 3-X by placing a ground potential on both sides of the relay 3-X.

Operation of the relay 3-RBT opens the busy tone path BA to the calling station 111, as shown in FIG. 4, by opening a normally closed contact 3-RBT-1. The ground return path for busy tone comprising a normally open contact 3-ON-4, a normally closed contact 3-RBT-2 and a capacitor C4 is also broken by the opening of the normally closed contact 3-RBT-2. Capacitor C4 provides an AC ground return path and in the preferred embodiment had a value of 0.1 microfarads. At the same time, a 440 Hertz tone generated by an oscillator 422 and level controlled by an amplifier 423 is transmitted to both the calling station 111 and the called station 110. The 440 Hertz tone applied to the calling station 111 is over a path containing a capacitor C5, a resistor R11, a normally closed contact 3-CT-2 and a pair of normally open contacts 4-CHK-2 and 3-RBT-4. Similarly, the 440 Hertz tone applied to the called station 110 is over a path containing a capacitor C13, a resistor R10, a normally closed contact 3-CT-3 and a pair of normally open contacts 4-CHK-4 and 3-RBT-5. Resistors R10 and R11 and capacitors C5 and C13 provide tone level control and DC isolation, respectively, in the 440 Hertz tone path. In one embodiment resistors R10 and R11 had values of 10 kilohms and the capacitors C5 and C13 had values of one microfared.

With the input to the delay timer τ2 grounded by the closure of normally open contact 3-Y-2, as shown in FIG. 3, a ground is supplied to one side of the relay 3-CT through a path containing a transient protection diode D-CT1 and a normally closed contact 3-CT-11. The other side of relay 3-CT is held at a battery potential of −48 volts through a normally closed contact 3-CB-10. Actuation of the relay 3-CT is maintained by a ground lock path through normally open contacts 3-ON1-7 and 3-CT-11. A diode D-CT2 is connected across the winding of the relay 3-CT for protection against transient voltages generated by relay contact closures. The actual operation of the relay 3-CT is delayed by approximately 750 milliseconds and this delay is provided by delay timer τ2. Fine adjustment on the length of the delay is controlled by a resistor R5 and a capacitor C10. In the preferred embodiment resistor R5 had a value of 432 kilohms and capacitor C10 had a value of two microfarads. With the operation of the relay 3-CT, the 440 Hertz tone applied to the calling station 111 and the called station 110 is removed by opening the normally closed contacts 3-CT-2 and 3-CT-3 in the 440 Hertz tone path.

During the 750 millisecond interval a switchhook flash by the calling station 111 will not be recognized because of the maintenance of a ground potential to the flash detect circuit comprising relays 3-X and 3-Y through a normally closed contact 3-CT-12 and a normally open contact 3-RBT-9. Following the operation of the relay 3-CT an additional ground holding path for the relay 3-ON is provided by the closure of a normally open contact 3-CT-12.

After the 440 Hertz tone is removed, the calling station 111 may go on-hook at which time relay 4-S releases. This, in turn, releases relay 3-Y. However, relay 3-ON is held operated by the relay 3-CT and the continued actuation of relay 3-ON maintains ground on sleeve lead SO through the normally open contact 3-ON-8 thereby holding the connection to the calling station 111.

1.8 Called Station Goes Idle

When the called station 110 goes idle at the conclusion of the connection with the third party station 112, a ringing signal is supplied to both the called station 110 and the calling station 111. If both stations affirmatively respond to this ringing signal is talking path is established between the calling station 111 and called station 110. The establishment of this taking path is effected in the manner hereinafter described.

When the called station 110 goes idle the operate battery for relay 4-CHK is removed causing it to release which, in turn, causes the release of the 3-CHKA relay. The release of the relay 3-CHKA causes the actuation of the apply ringing relay 3-AR. This actuation is effected by the application of a ground to one side of the 3-AR relay through a path containing a normally open contact 3-CT-6 and a pair of normally closed contacts 3-CHKA-3 and 3-AR-11. With the operation of the 3-AR relay a ground lock path is provided through a pair of normally open contacts 3-ON1-3 and 3-AR-11. Battery potential for the actuation of the 3-AR relay is supplied through a normally closed contact 3-CB-12.

Operation of the relay 3-AR opens the operate path for the relay 4-CHK by opening normally closed contact 3-AR-4. In addition, the operation of the relay 3-AR provides a holding ground for the operation of a relay 4-RT-1 through a normally open contact 3-AR-5. A further effect of the operation of the relay 3-AR is that a ringing signal from a ringing source 421 is supplied to both the calling station 111 and the called station 110 over ring leads RO and RT, respectively, via relays 4-RT1 and 4-RT. The ringing signal path to the calling station 111 includes normally open contacts 3-ON-2 and 3-AR-8 and a normally closed contact 4-RT1-7. Correspondingly, the ringing signal supplied to the called station 110 is over a path including normally open contacts 3-ON-7 and 3-AR-10 and a normally closed contact 4-RT-7. A ground return path for the ringing signal is provided from tip lead TT through normally closed contact 4-RT-5 and normally open contacts 3-ON-6 and 3-AR-12 to a ground point via ground lead RG, and from tip lead TO through normally open contacts 3-AR-6 and 3-ON-1 and normally closed contact 4-RT1-5. The ringing signal is also coupled to the ring counter 424 through a normally open contact 3-AR-1 and a normally closed contact 4-S-6.

1.9 Both Stations Answer within a Predetermined Numer of Rings

With the ringing signal supplied to both the calling station 111 and the called station 110 the answering by each of these stations within a predetermined number of rings causes a talking path to be established. When the calling station 111 answers, the relay 4-RT1 is operated via its station loop. Relay 4-RT1 is locked operated via its secondary winding by the closure of a normally open contact 4-RT1-12. In addition, the operation of the relay 4-RT1 provides an operate path for the relay 4-S via the calling station loop through normally open contacts 3-AR-6, 3-AR-8, 4-RT1-5 and 4-RT1-7. The operation of relay 4-RT1 also opens a ground holding path for relay 3-ON by opening normally closed contact 4-RT1-9. The ringing path to the calling station 111 is opened by the operation of the relay 4-RT1 by the opening of normally closed contact 4-RT1-7.

Audible ringback of the ringing signal supplied to the called station 110 is returned to the calling station 111 via a path including the normally open contact 3-ON-7, the normally closed contact 4-RT-7, a pair of normally open contacts 3-RBT-11 and 3-AR-2, and capacitors C6 and C12. In the preferred embodiment capacitors C6 and C12 had values of 0.04 microfarads and 2.15 microfarads, respectively.

The reactuation of the relay 4-S provides talk battery to the calling station 111. Furthermore, reactuation of relay 4-S reoperates relay 3-X. When the called station 110 answers, the relay 4-RT is operated via the called station loop. Operation of the relay 4-RT is locked via its secondary winding by the closure of normally open contact 4-RT-12. It should be noted that a normally open contact 3-ON-12 had been closed by a previous actuation of the 3-ON relay. With the actuation of the relay 4-RT an operate path for a destination supervisory relay 4-D is provided via the station loop of the called station 110. This operate path for the relay 4-D through the station loop of the called station 110 includes normally open contacts 4-RT-5, 3-AR-12, 3-AR-10 and 4-RT-7. With the actuation of relay 4-RT the normally closed contact 4-RT-7 is opened which, in turn, opens the ringing signal path to the called station 110. Finally, actuation of the 4-RT relay provides a tip and ring transmission path via normally open contacts 4-RT-5 and 4-RT-7 and capacitors C11 and C12 to the calling station 111. In the preferred embodiment capacitor C11 had a value of 2.15 microfarads.

Talk battery to the called station 110 is provided by the operation of the 4-D relay. At this point, the tip and ring path TO and RO to the calling station 111 and the tip and ring path TT and RT to the called station 110 are individually supervised and capacitively coupled. No further action occurs until the calling station 111 releases at which time executive ringback trunk circuit 116 restores to an idle condition.

1.10 Called Station Does Not Answer if the called station 110 does not answer, the calling station 111 may disconnect by going on-hook. When this occurs relay 4-S releases which, in turn, operates relay 3-Y. Previously operated relay 3-CT and an operated 3-Y relay combine to operate a relay 3-CB by providing a ground through normally open contacts 3-Y-1, 3-X-12 and 3-CT-9. A diode D-CB is connected across the control winding of the relay 3-CB for increasing its release time. The operation of the relay 3-CB causes the release of relays 3-X, 3-Y, 3-CT, 3-AR and 3-RBT by breaking the battery supply paths through the opening of normally closed contacts 3-CB-11, 3-CB-10 and 3-CB-12. In the case of the relay 3-RBT, operation of the relay 3-CB breaks a ground holding path comprised of a normally closed contact 3-CB-8 and normally open contacts 3-ON-3 and 3-RBT-7. With the release of relays 3-CT and 3-Y the relay 3-CB is also released by the opening of ground holding paths comprised of normally open contacts 3-CT-1, 3-Y-3 and 3-CB-9.

The release of relays 4-S and 3-CT breaks the operate path for relay 3-ON by the opening of normally open contact 4-S-2 and 3-CT-12 which previously had been closed. The release of relay 3-ON further causes the release of relay 3-ON1. With the release of relays 3-ON and 3-ON1 all holding grounds are removed at which time the executive ringback trunk circuit 116 restores to an idle condition.

1.11 Calling Station Does Not Answer Within a Predetermined Number of Rings

If the called station 110 answers as described previously but the calling station 111 does not answer, audible ringback is returned to the called station 110 via capacitors C1, C2, C11, C12; normally open contacts 4-RT-7, 3-AR-10, 4-RT-5, 3-AR-12; and the primary winding of relay 4-RT1 including normally open contacts 3-ON-2 and 3-AR-8 and normally closed contact 4-RT1-7. This condition will persist for a predetermined number of ringing cycles, which in the preferred embodiment was chosen to be eight, after which the ring counter 424 is operated which, in turn, operates release relay 4-RLS. A diode D-RLS is connected across the control winding of the relay 4-RLS for transient protection purposes. Actuation of the relay 4-RLS opens the ground path to the relay 3-ON thereby releasing it which, in turn, releases relay 3-ON1. Relays 3-ON and 3-ON1 released open all holding grounds and the executive ringback trunk circuit 116 is restored to an idle condition.

1.12 Calling Station Does Not Wait for Called Station to Go Idle

When a ringback condition is initiated as described previously but the calling station 111 decides not to wait until the called station 110 goes idle the calling station 111 may completely release the connection by going off-hook and back on-hook again. With the calling station 111 going off-hook relay 4-S operates which, in turn, operates relay 3-X. When the calling station 111 goes back on-hook relay 4-S releases which, in turn, operates relay 3-Y. With the operation of relay 3-Y in conjunction with the previous operation of relay 3-CT a ground operate path is provided for the relay 3-CB. Operation of relay 3-CB causes the release of relays 3-X, 2-Y, 3-CT, 3-AR and 3-RBT as heretofore described. The release of relay 3-CT then causes the release of relay 3-CB. As relays 4-S and 3-CT return to a normal state, the operate path for relay 3-ON is opened causing it to release which, in turn, causes the release of relay 3-ON1. Relays 3-ON and 3-ON1 released, remove all holding grounds and the circuit restores to an idle condition.

1.13 Calling Station Enables Ringback Subsequent to Called Station Going Idle

When the calling station 111 initiates a switchhook flash the executive ringback trunk circuit 116 functions as described previously in Section 1.7. Also the relay 3-CT is actuated because relays 4-CHK and 3-CHKA are released when the called station 110 goes idle. The operate path for relay 3-CT is via normally open contacts 3-ON1-7 and 3-Y-4 and normally closed contacts 3-X-10, 4-CHK-7 and 3-CB-10. The operation of relay 3-CT opens the 440 Hertz tone path by opening normally closed contacts 3-CT-2 and 3-CT-3 thereby preventing tone application, as described in Section 1.7 above, prior to the ringing of the called station 110. In addition, with relay 3-CT operated and relay 3-CHKA in an unoperated state, relay 3-AR is actuated by the application of ground via a path containing normally open contact 3-CT-6 and normally closed contacts 3-CHKA-3 and 3-AR-11. Battery potential for the actuation of the relay 3-AR is supplied through a normally closed contact 3-CB-12. With relay 3-AR actuated ringing is supplied to the called station 110 as described heretofore in Section 1.8. Since the station loop is maintained by the calling station 111 relay 4-RT1 is immediately operated and the ringing path to the calling station 111 is held open preventing the application of the ringing signal to it.

1.14 Summary

In summary, circuitry for permitting a calling station 111, equipped with a class of service which allows executive ringback, to automatically obtain a ringback of a call placed to a busy called station 110 has been described. Implementation of the executive ringback feature is instituted by a switchhook flash at the calling station 111 in response to a busy condition of the called station 110. Upon receipt of the switchhook flash the executive ringback circuitry supplies an executive ringback alerting signal to both the called station 110 and the calling station 111. At this point the calling station 111 may go on-hook and at the conclusion of the connection between the called station 110 and the third party station 112 both the calling and called stations receive a ringback signal. If the ringback signal goes unanswered by the calling party after a predetermined number of rings, the executive ringback circuitry is automatically released. As an added feature, should the called station 110 go idle prior to the initiation of a switchhook flash by the calling station 111 a ringing signal is immediately supplied to the called station 110 and a talking path is established as soon as the called station 110 answers.

In all cases it is to be understood that the above-described embodiment is illustrative of but a small number of many possible specific embodiments which can represent applications of the principles of the invention. Thus, numerous and varied other embodiments can readily be devised in accordance with these principles by those skilled in the art without departing from the spirit and scope of the invention.

What is claimed is:

1. In a telephone switching system having a plurality of line circuits terminated in station sets, said line circuits being interconnectable to a plurality of trunk circuits through crosspoint connections in a multistage switching network, the invention comprising executive ringback circuitry for completing a connection between a calling station and a called station at the conclusion of a connection between said called station and a third party station, said executive ringback circuitry including means for determining the class of service provided to said calling station, means for detecting a busy condition of said called station, means, activated by said class of service determining means and said busy condition detecting means, for seizing said executive ringback circuitry provided said calling station has a class of service permitting executive ringback, means for enabling said executive ringback circuitry in response to a switchhook flash from said calling station, and means, responsive to said switchhook flash enabling signal from said calling station, for holding said seizure of said executive ringback circuitry to maintain said crosspoint connections through said multistage switching network until said busy called station goes idle.

2. The telephone switching in accordance with claim 1 wherein the executive ringback circuitry further includes means for alerting said busy called station for a predetermined time interval that executive ringback is to be effected, and means for controlling the duration of said predetermined time interval.

3. The telephone switching system in accordance with claim 1 wherein the executive ringback circuitry further includes means, activated by said enabling means, for providing an executive ringback acknowledgment signal for a predetermined time interval to said calling station in response to said switchhook flash, and means for controlling the duration of said predetermined time interval.

4. The telephone switching system in accordance with claim 1 wherein the executive ringback circuitry furthher includes means for automatically denying executive ringback to said calling station when said called station is busy as a result of a previous camp-on connection, and means for notifying said calling station that executive ringback is denied.

5. The telephone switching system in accordance with claim 1 wherein the executive ringback circuitry further includes means for detecting a return to an idle condition of said called station at the conclusion of said connection between said called station and said third party station, means, responsive to said detection of a return to an idle condition of said called station, for supplying a predetermined number of ringing signals to said calling and called stations, and means for establishing a talking path between said calling and called stations in the event both said calling and called stations go off-hook during said predetermined number of ringing signals.

6. The telephone switching system in accordance with claim 5 wherein the executive ringback circuitry further includes means, activated by said calling station going off-hook in response to said ringing signals within said predetermined number of said signals, for disconnecting said ringing signal supply means from said calling station, means for supplying an audible ringback signal to said calling station, and means, activated by said called station going off-hook in response to said ringing signals within said predetermined number of said signals, for disconnecting said ringback signal supply means from said calling station.

7. The telephone switching in accordance with claim 5 wherein the executive ringback circuitry further includes means, activated by said called station going off-hook in response to said ringing signals within said predetermined number of said signals, for disconnecting said ringing signal supply means from said called station, means for supplying an audible ringback signal to said called station, and means, activated by said calling station going off-hook in response to said ringing signals within said predetermined number of said signals, for disconnecting said ringback signal supply means from said called station.

8. The telephone switching system in accordance with claim 5 wherein the executive ringback circuitry further includes means for detecting a failure of said calling station to respond to said ringing signals within said predetermined number of said signals, and means, activated by said detecting means, for releasing said seized executive ringback circuitry and thereby releasing said crosspoint connections through said multistage switching network at the termination of said predetermined number of ringing signals.

9. The telephone switching system in accordance with claim 5 wherein the executive ringback circuitry further includes means, activated by said calling station going off-hook and then on-hook, for releasing said seized executive ringback circuitry prior to said called station goind idle in the event a user of said calling station wants to abandon an executive ringback connection.

10. Circuitry for controlling the establishment of executive ringback connections between a calling station having a class of service which permits it to effect ringback call connections and a busy called station, said called station engaged in a connection with a third party station, said circuitry comprising means, responsive to a call from said calling station to said called station, for detecting a busy condition of said called station, and means, subsequently activated by said detecting means and responsive to a switchhook flash from said calling station, for effecting the establishment of call connections between said calling station and said busy called station at the conclusion of said connection between said third party station and said busy called station.

11. Executive ringback circuitry comprising means for seizing said circuitry in response to a call from a calling station having a class of service which permits it to effect executive ringback call connections to a busy called station, means, responsive to a receipt of a switchhook flash from said calling station, for establishing executive ringback connections between said calling station and said busy called station, and means, activated by said establishing means, for supplying an executive ringback signal over said established connections to said calling and called stations for a predetermined time interval.

12. The executive ringback circuitry in accordance with claim 11 further comprising means, activated upon termination of said executive ringback signal, for holding said seized executive ringback circuitry and said established connections between said calling and called stations until said called station goes idle, means for detecting a return to an idle condition of said called station, and means, responsive to said detection of a return to an idle condition of said called station, for supplying a predetermined number of ringing signals to said calling and called stations.

13. The executive ringback circuitry in accordance with claim 12 further comprising means, activated by said calling station going off-hook in response to said ringing signals within said predetermined number of said signals, for disconnecting said ringing signal supply means from said calling station, means for supplying an audible ringback signal to said calling station, and means, activated by said called station going off-hook in response to said ringing signals within said predetermined number of said signals, for disconnecting said ringback signal supply means from said calling station.

14. The executive ringback circuitry in accordance with claim 12 further comprising means, activated by said called station going off-hook inn response to said ringing signals within said predetermined number of said signals, for disconnecting said ringing signal means from said called station, means for supplying an audible ringback signal to said called station, and means, activated by said calling station going off-hook in response to said ringing signals within said predetermined number of said signals, for disconnecting said ringback signal supply means from said called station.

15. The executive ringback circuitry in accordance with claim 12 further comprising means for detecting a failure of said calling station to respond to said ringing signals within said predetermined number of said signals, and means, activated by said detecting means, for releasing said seized executive ringback circuitry at the termination of said predetermined number of ringing signals.

16. The executive ringback circuitry in accordance with claim 14 further comprising means, activated by said calling station going off-hook and then on-hook, for releasing said seized executive ringback circuitry prior to said called station going idle in the event a user of said calling station wants to abandon an executive ringback connection.

* * * * *